United States Patent [19]
Townsend

[11] 3,952,626
[45] Apr. 27, 1976

[54] QUICK-RELEASE FASTENERS

[76] Inventor: Phillip Townsend, 87 Wentworth Road, Vaucluse, 2030 New South Wales, Australia

[22] Filed: Oct. 25, 1974

[21] Appl. No.: 517,863

Related U.S. Application Data

[62] Division of Ser. No. 295,016, Oct. 4, 1972, abandoned.

[30] Foreign Application Priority Data

Oct. 7, 1971 Australia.............................. 6559/71
Nov. 18, 1971 Australia.............................. 7080/71

[52] U.S. Cl. ................................................. 85/33
[51] Int. Cl.² ........................................ F16B 37/10
[58] Field of Search............................ 85/33, DIG. 1

[56] References Cited
UNITED STATES PATENTS

| | | | |
|---|---|---|---|
| 1,406,804 | 2/1922 | Alexander............................ | 85/33 |
| 1,475,907 | 11/1923 | Volman ................................ | 85/33 |
| 1,915,588 | 6/1933 | Annington............................ | 85/33 |
| 2,432,933 | 12/1947 | Peterson........................ | 85/DIG. 1 |
| 3,053,131 | 9/1962 | Stott ..................................... | 85/33 |
| 3,334,536 | 8/1967 | Armstrong............................ | 85/33 |
| 3,695,139 | 3/1970 | Howe................................... | 85/33 |

FOREIGN PATENTS OR APPLICATIONS

| | | | |
|---|---|---|---|
| 907,211 | 6/1945 | France................................. | 85/33 |
| 1,013,341 | 4/1952 | France................................. | 85/33 |

*Primary Examiner*—Roy D. Frazier
*Assistant Examiner*—Thomas J. Holko
*Attorney, Agent, or Firm*—Orrin M. Haugen

[57] ABSTRACT

A quick-release fastener device for fitment to the shank of a screw, stud or pin or the like device. The fastener is characterized by the provision of a collet member, which is composed of a number of segmental collet elements, and a retaining member which surrounds the collet member to retain the elements thereof in a cooperative relationship. The collet member is displaceable within or from the retaining member to permit separation of the collet elements one from the other and, hence, to permit quick release of the fastener from a device to which it is fitted.

3 Claims, 14 Drawing Figures

3,952,626

QUICK-RELEASE FASTENERS

This is a division of application Ser. No. 295,016, filed Oct. 4, 1972, and now abandoned.

BACKGROUND OF THE INVENTION

This invention relates to a quick-release fastener for fitment to the shank of a screw, stud or pin or the like.

The invention may be broadly defined as comprising a fastener having a collet member composed of at least two segmental collect elements which, when fitted together in cooperating relationship, define an aperture, and a retaining member which is adapted to retain the collet elements in the cooperating relationship, the collet member being movable within or from the retaining member whereby the collet elements are moved or are permitted to move out of their cooperating relationship.

The collet member is preferably composed of two or more segmental elements which, when fitted together, define a threaded nut, the aperture defined by the collet elements being a centrally located through-bore which is threaded to receive the threaded shank of a screw, bolt or stud.

The retaining member acts against the periphery or a peripheral portion of the collet member to hold the elements of such member in their cooperating relationship, but the retaining member is removable or, at least, in part removable from the collet member to permit separation of the segmental elements and thus to permit quick release of the collet member from a device to which it is fitted.

SUMMARY OF THE INVENTION

A typical application of the fastener in accordance with the invention is in the securement of a panel, of the type which should be readily removable, to a superstructure. Where the collet member is in the form of a nut, the panel might be secured and be removed in the conventional manner by use of a spanner other than in the event of an emergency, but in the course of an emergency, the fastener might be quickly released by disengaging or partially disengaging the retaining member from the collet member to permit separation of the collet elements. This operation would avoid the need for spanners, which might not be readily available when required.

The respective members of the fastener may be configured and be inter-engaged in various ways whilst preserving the basic concept of the invention, and a number of different arrangements are described as follows, by way of example only, with reference to the accompanying drawings.

DESCRIPTION OF THE PREFERRED EMBODIMENT

Figure 1:
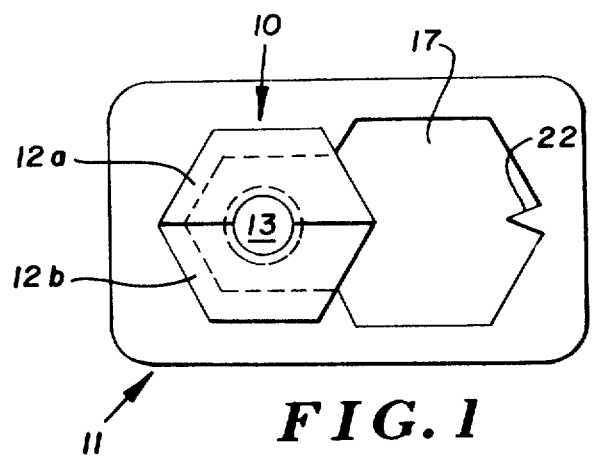
FIGS. 1 to 3 show an assembled plan view, and assembled perspective view and an exploded perspective view respectively of a first embodiment of the invention.
Figure 2:
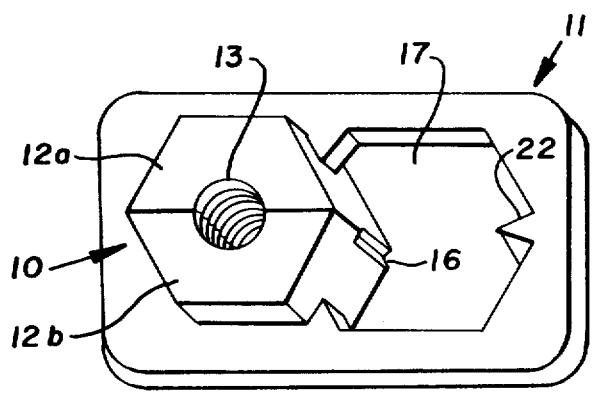
Figure 3:
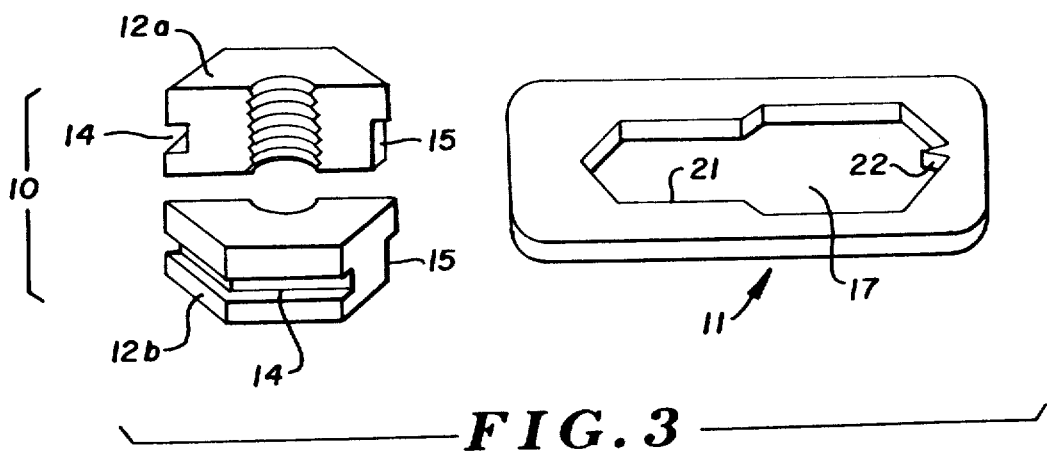
Figure 4:
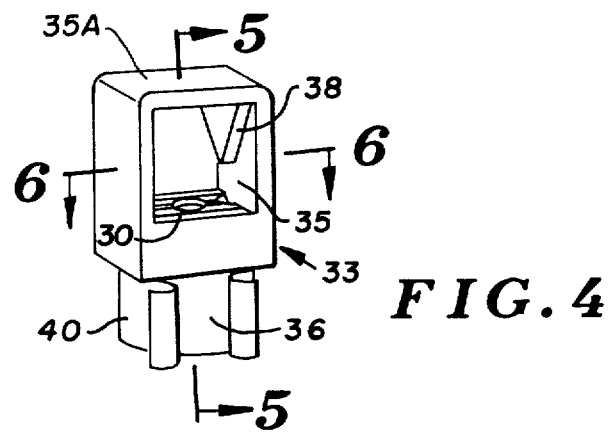
FIG. 4 is a perspective view of a second embodiment of the fastener, shown in assembled condition.
Figure 5:
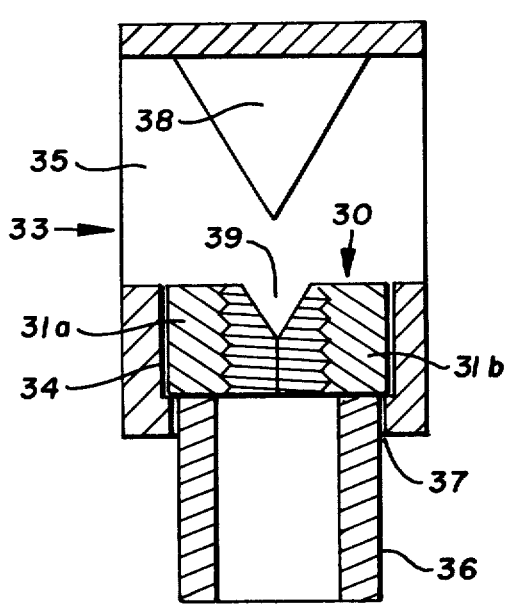
FIGS. 5 and 6 are sectional elevation and plan views respectively of the fastener taken along section planes 5—5 and 6—6 of FIG. 4.
Figure 7:
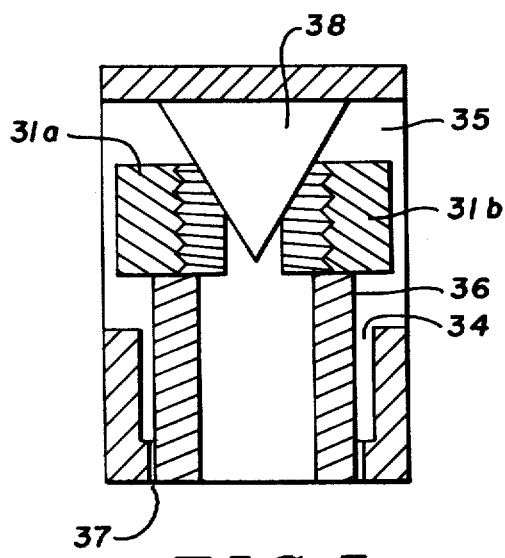
FIG. 7 is a sectional elevation view similar to that shown in FIG. 5 but illustrating the fastener in a partially disassembled condition.
Figure 6:
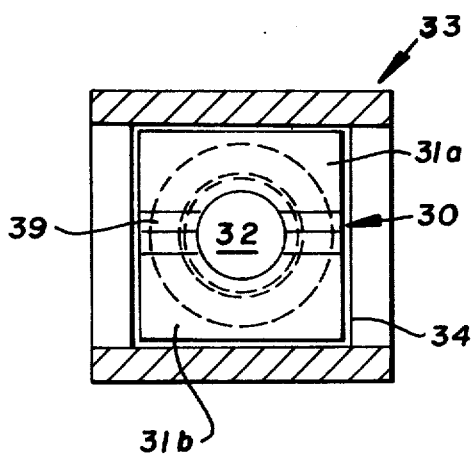

With reference to FIGS. 1 to 3 of the drawings, the fastener comprises a collet member 10 and a retaining member 11 which is removably fitted to the collet member.

The collet member is composed of two segmental elements 12a and 12b which, when fitted together in cooperating relationship, form a hexagon lock nut and define a central threaded bore 13. Each of the segmental elements is formed around two corresponding sides thereof with a groove 14 for receipt of the retaining member 11. Also, each of the elements 12a and 12b is formed at one ungrooved corner thereof with a chamfer 15, which chamfers define a V-notch 16 with the elements positioned in the cooperating relationship.

The retaining member 11 is formed from a flat metal plate to include a generally key-hole shaped slot 17, as is most clearly shown in FIG. 3. The slot includes a clamping zone, defined by slot walls 18, 19, 20 and 21, and an enlarged area defined by the walls forming the balance of the slot outline.

The slot walls 18–21 correspond approximately in size and shape with the groove 14 and they serve to hold the collet elements 12a and 12b in clamping relationship when the two members 10 and 11 are assembled together as shown in FIG. 2. Thus, upon assembly of the two members, the fastener may be employed as a conventional nut, by screwing it onto or from a screw or stud or the like, or it may be employed as a quick-release fastener by driving the retaining member 11 out of engagement with the groove 14 and thereby locating the collet member 10 within the enlarged area of the retaining member. With the collet member located in this latter position, the segmental elements may be separated one from the other and, hence, from the screw or stud.

To facilitate separation of the collet elements 12a and 12b, the end portion of the slot 17 is formed with a chisel point 22 which is engageable in the notch 16 of the collet member.

In order to improve the clamping action of the retaining member 11 on the collet member 10, the walls 18 and 21 of the retaining member may be tapered inwardly toward the walls 19 and 20 and/or the corresponding walls of the groove 14 may be slightly curved.

To guard against unauthorized or unintentional movement of the retaining member 11 relative to the collet 10, an insert (not shown) may be positioned within the enlarged area of the retaining member slot. Such insert may take the form of a frangible moulding, a replaceable metal disc or a spring element. However, in an alternative construction, the retaining member may be held captive to the collet member by a shear pin or pins extending through both members.

Reference is now made to the second embodiment of the invention, as illustrated in FIGS. 4 to 7 of the drawings.

As in the above-described embodiment, the fastener comprises a collet member 30 which is composed of two segmental elements 31a and 31b which together define a central threaded bore 32; but in this case, the collet member is normally retained or housed within a cage-like retaining member 33.

The retaining member has a square-section lower pocket 34 of a shape and size to accommodate the assembled collet member 30 in close-fitting driving relationship and it is formed in its upper portion 35 with open side walls to permit removal of the collet elements 31a and 31b from within the retaining member.

The outer walls of the retaining member 33 are profiled as a square-section for engagement by a spanner, and normal turning of the collet member 30 (as a nut) is effected by turning the entire fastener assembly.

A spacer member 36 forms a part of the fastener and it is located within a lower bore 37 of the retaining member. The spacer is a sliding press fit in the bore 37 of the retaining member and it is movable into the lower pocket 34 of the retaining member for urging the collet member 30 out from the pocket.

To effect quick release of the fastener, the retaining member 33 is driven downwardly from anvil surface 35A with respect to the collet member 30 and the spacer member 36 in order that the collet elements 31a and 31b will be positioned within the upper portion 35 of the retaining member and be thereby separately removable. To facilitate separation of the collet elements, the upper side walls of the retaining member are formed with integral chisel blades 38 which engage in notched portions 39 of the collet elements. The notches 39 are located on the parting line of the two collet elements.

In order that unintentional release of the fastener and, hence, downward movement of the retaining member 33 might be prevented, a removable sleeve 40 (FIG. 4) may be located about the spacer member and about the underside of the retaining member. Also, in order to prevent displacement of the collet elements from within the retaining member, prior to assembly of the fastener to a screw, a plastic insert or a compression spring might be located within the upper portion of the retaining member to bear downwardly upon the collet elements.

Figure 8:
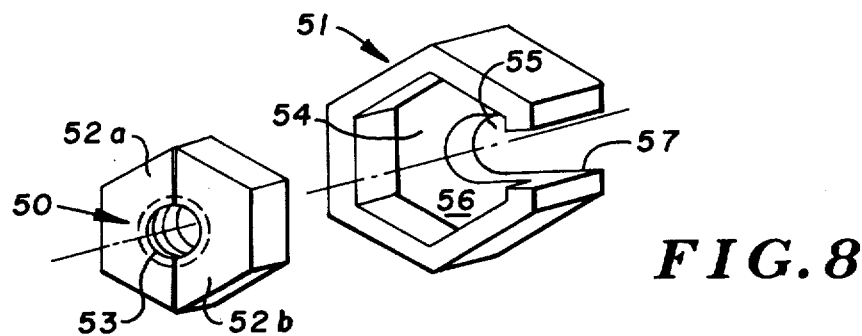
FIG. 8 is an exploded perspective view of a third embodiment of the fastener.
Figure 9:
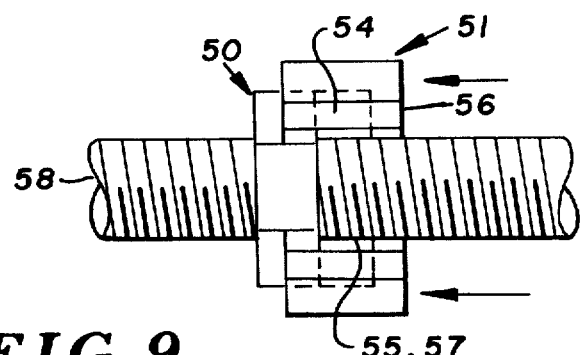
FIG. 9 is an elevation view of the same (FIG. 8) fastener shown in partially assembled condition.

Referring now to FIGS. 8 and 9 of the drawings, the fastener therein illustrated comprises a collet member 50 and a sleeve-like cage or retaining member 51.

The collet member 50 is composed of two separate segmental elements 52a and 52b which, when fitted together in cooperating relationship, form a hexagonal nut having a threaded bore 53.

The retaining member 51 is in the form of a cage having a first bore portion 54 and a second stepped bore 55 in the end wall 56 thereof. The first bore portion 54 has a shape and size corresponding with the periphery of the collet member, and the second bore 55 has a diameter slightly larger than the major diameter of the threaded hole 53 in the collet member.

The wall portion 56 of the retaining member is slotted at 57, the slot extending into the second bore 55 of the retaining member and having a width approximately equal to the diameter of such bore.

The above-described fastener is intended primarily for fitment as a nut to a threaded shaft or pipe 58 which has inaccessible ends. Thus, as shown in FIG. 9, the collet elements 52a and 52b may be located upon the threaded shaft, as separate segments, at a position intermediate the ends of the shaft, the retaining member being fitted to the shaft by way of the slot 57 at a position displaced axially from the collet member, and the retaining member being then shifted axially to locate around the collet member. Thereafter, the collet elements 52a and 52b would be prevented from separating and the entire fastener assembly may be screwed as a unit along the shaft 58.

To prevent unintentional axial separation of the retaining member 51 from the collet member 50, the respective members may be formed on their interengaging surfaces with a taper or they may be interconnected by way of a removable fastening element.

Figure 10:
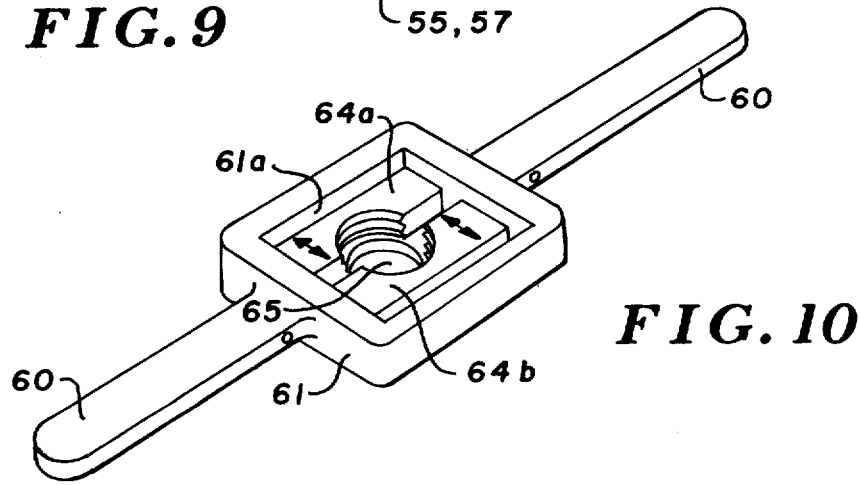
FIGS. 10 and 11 show perspective and elevation views respectively of a fourth embodiment of the fastener, the retaining member of the fastener in this case taking the form of a wrench.
Figure 11:
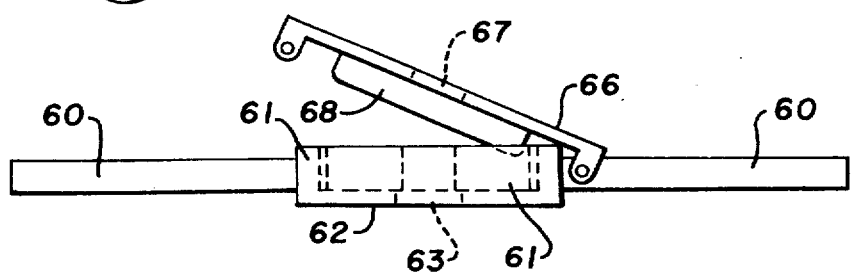

The fourth embodiment of the fastener, as shown in FIGS. 10 and 11, is in the form of a wrench having handles 60 and a central body portion 61.

The body portion, which is referred to herein as a retaining member, is formed with a recess 61a, and a lower wall 62 of the body portion is formed with a central aperture 63.

Two separated segmental elements 64a and 64b, which cooperate to form a single collet member, are located within the recessed portion of the body 61. The segmental elements 64a and 64b are shown separated in FIG. 10 of the drawings but, when fitted together in abutting cooperating relationship, they form a nut having a threaded bore 65.

The two segmental elements are movable toward and away from one another, within the recessed body 61, in the direction indicated by the arrows in FIG. 10.

A cover member 66 is hinge-mounted to one side of the body portion 61 as shown in FIG. 11, it being omitted from FIG. 10 for the sake of clarity, and, when closed upon the body portion, the cover member serves to retain the collet segments within the body portion.

The cover member is apertured at 67 in alignment with the aperture 63 in the lower wall 62 of the body portion.

Also, the cover member 66 is formed upon its underside with two laterally spaced, downwardly projecting integral tongues 68. Such tongues are spaced apart by a distance corresponding to the total lateral width of the collet elements 64a and 64b, and, upon closure of the cover member, the tongues 68 locate within the spaces 69 at each side of the collet elements.

Thus, with the cover member 66 in the closed position, the collet elements 64a and 64b are held in their closed cooperating relationship to form a nut, but quick release or opening of the nut may be effected simply by opening the cover member.

It will be appreciated that, in a variation of this above-described embodiment, one of the collet elements might be formed integrally with one wall of the body portion 61. In such case, one only of the collet elements would be movable to-and-fro in the directions of the arrows, but its total movement would have to be equal to at least the minimum possible combined movements of the two collet elements of the preceding description.

Figure 12:
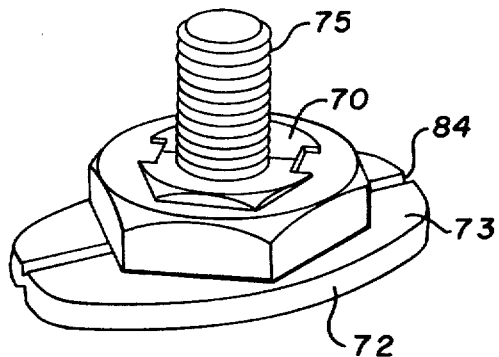
FIG. 12 shows a perspective view of a fifth embodiment of the fastener mounted to a screwed stud.
Figure 14:
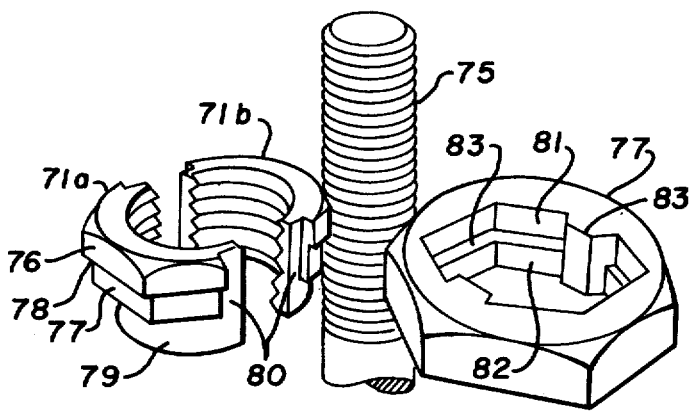

Reference is now made to FIGS. 12 and 14 of the drawings and to the fifth embodiment of the invention illustrated thereby.

In this embodiment, the fastener comprises a collet member 70, which is composed of two segmental collet elements 71a and 71b, a retaining member 72, and a packing member 73.

The collet elements 71a and 71b are cooperable to form a nut having a central screwed bore 74 and, as such, they are adapted for screw mounting to a threaded shaft 75.

The collet member 70, as defined by the two collet elements, is formed with an upper hexagonal periphery 76, an intermediate hexagonal peripheral portion 77, which is separated from the upper peripheral portion 76 by a land 78, and a lower annular peripheral portion 79. Also, the walls of the collet member are formed with diametrically opposed grooves 80.

The retaining member 72 has the general appearance of a hexagon nut, but its central bore is formed with two inter-communicating hexagonal recesses 81 and 82. The two recesses 81 and 82 are separated by a shoulder 83 and the recesses are sized to fit neatly about the respective peripheral portions 76 and 77 of the collet member. The collet land 78 would normally sit upon the shoulder 83 of the retaining member.

The axially length of the collet member 70 exceeds that of the retaining member 72 by an amount equal to the length of the annular portion 79 of the collet member. Thus, with the collet member seated within the retaining member in inter-engaging relationship, the annular portion 79 of the collet member projects below the retaining member.

A pair of opposed tongues 83 are formed integrally with the retaining member for location in the collet member grooves 80.

Figure 13:
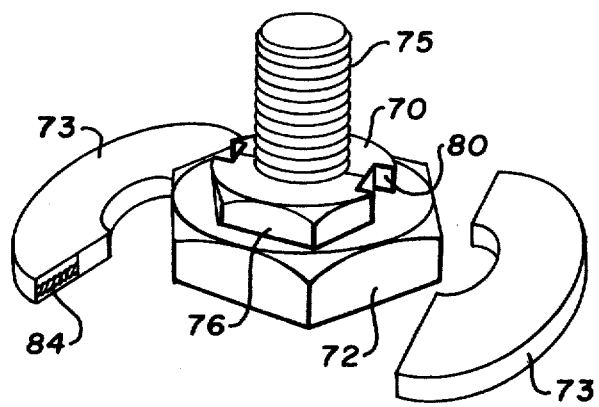
FIGS. 13 and 14 show perspective views of the same (FIG. 12) fastener in partially and fully disassembled conditions, respectively.

The packing member 73 would normally be formed from a frangible or destructable material and, although constituted by a single element, it would be formed with weakened zones 84 to permit it to be broken in halves (as shown in FIG. 13). The packing member has a central aperture which is sized to fit about the annular portion 79 of the collet member and it has a thickness corresponding with the length of the collet's annular portion.

Thus, when fitted below the retaining member 72, the packing member serves to hold the retaining member in locking engagement with the collet member and the entire assembly would function as a conventional nut. However, when the packing member 73 is broken away from the underside of the retaining member, such member may be moved axially with respect to the collet member as shown in FIG. 13 and, due to the stepped arrangement of the collet member periphery, the collet elements 71a and 71b might be separated.

It will be appreciated from the foregoing that the basic concept of the invention resides in the provision of separable collet elements which are normally retained in cooperable relationship by a clamp, cage, sleeve or, more generally, a retaining element. Thus, it will be further appreciated that the foregoing descriptions of specific embodiments are given by way of example only and that the scope of the invention is to be limited only by the appended claims.

I claim:

1. A quick release fastener device which is adapted to engage with the threaded shank of a screwed member and to clamp against a work piece, the fastener device comprising:
   a. a collet member comprising at least two independent segmental collet elements which are adapted to be fitted together in cooperating relationship to define a threaded aperture, said collet elements having notches formed therein at one end thereof and converging to respective planes of separation along which the collet elements separate from one another upon being fitted together;
   b. a retaining member for retaining the collet elements in said cooperating relationship and including engaging means adapted to hold said collet elements against rotation with respect to one another and with respect to said retaining member;
   c. said retaining member being in the form of a rigid cage having first and second zones spaced axially of the threaded shank, the first zone comprising a pocket in which the collet member is snugly fit to retain the collet elements in said cooperating relationship, and the second zone providing for lateral separation of the collet elements and being of larger cross-section than said collet members in said cooperating relationship;
   d. an anvil surface on the end of said retaining member remote from said pocket;
   e. wedge means formed within and being integral with the second zone of the retaining member, said wedge means flanking said second zone and converging towards a wedge tip normally directed at and aligned axially with said notches formed in the collet members;
   f. a spacer member disposed between the surface of the work piece and the collet member and which resists axial movement of the collet member toward the work piece surface during displacement of the collet member from the first zone to the second zone of the retaining member;
   g. the arrangement being such that the retaining member is movable when struck on the anvil surface and forced in an axial direction toward the work piece surface effects relative axial displacement of the collet member from the first to the second zone of the retaining member simultaneously with said wedge tips entering the collet member notches whereby the collet elements are forced apart by the divergence of the wedge members to effect complete separation of said collet elements from one another and from the threaded shank before the limit of the axial movement of the retaining member is attained.

2. A fastener device as set forth in claim 1 in which said retaining member includes cage means having a first pair of opposed side walls formed integrally with said wedge means on opposed inner surfaces with said anvil surface spanning across the top of said cage, and with a second pair of opposed side walls being apertured to provide openings therein, the openings being disposed in said second zone through which the collet elements are ejected when the anvil surface is displaced by a force applied axially inwardly of the collet member.

3. A fastener device as set forth in claim 1 including radially removable sleeve located around the outer periphery of said spacer member and normally determining the axial spacing between said retaining member and said work piece surface.

* * * * *